United States Patent [19]

Okada et al.

[11] 4,432,054

[45] Feb. 14, 1984

[54] LOOP DATA TRANSMISSION CONTROL METHOD AND SYSTEM

[75] Inventors: Masakazu Okada; Hitoshi Fushimi; Seiichi Yasumoto; Takuji Hamada, all of Hitachi, Japan

[73] Assignee: Hitachi, Ltd., Tokyo, Japan

[21] Appl. No.: 297,405

[22] Filed: Aug. 28, 1981

[30] Foreign Application Priority Data

Sep. 3, 1980 [JP] Japan .................. 55-121074

[51] Int. Cl.³ .................. G06F 3/04; H04Q 9/00
[52] U.S. Cl. .................. 364/200; 340/825.5
[58] Field of Search ... 364/200 MS File, 900 MS File; 340/825.5, 825.51; 370/91

[56] References Cited

U.S. PATENT DOCUMENTS

| | | | |
|---|---|---|---|
| 3,764,981 | 10/1973 | Takasugi | 340/825.51 |
| 4,028,663 | 6/1977 | Royer et al. | 364/900 |
| 4,106,104 | 8/1978 | Nitta et al. | 364/900 |
| 4,159,518 | 6/1979 | Draper et al. | 364/200 |
| 4,199,661 | 4/1980 | White et al. | 370/91 |
| 4,227,178 | 10/1980 | Gergaud et al. | 340/825.51 |
| 4,232,294 | 11/1980 | Burke et al. | 340/825.5 |
| 4,240,140 | 12/1980 | Stafford et al. | 364/200 |
| 4,295,122 | 10/1981 | Hatada et al. | 340/825.5 |
| 4,359,731 | 11/1982 | Beauford et al. | 340/825.51 |
| 4,366,480 | 12/1982 | Van Hatten | 340/825.51 |

*Primary Examiner*—Jerry Smith
*Assistant Examiner*—Mark P. Watson
*Attorney, Agent, or Firm*—Antonelli, Terry & Wands

[57] ABSTRACT

A duplex transmission control system having active and inactive systems for totally controlling a looped transmission line on which computers and terminal devices are connected through respective stations. Each transmission control unit is operable to transmit and receive specific data related to the priority level specified for each unit. Each transmission control unit suspends the transmission of the clock for a certain period in response to the detection of the clock suspension, then transmits the specific priority data. When a transmission control unit detects its own transmitted signal, it is designated as the active system when another transmission control unit receives the signal defining the active system, it is designated as the inactive system.

6 Claims, 8 Drawing Figures

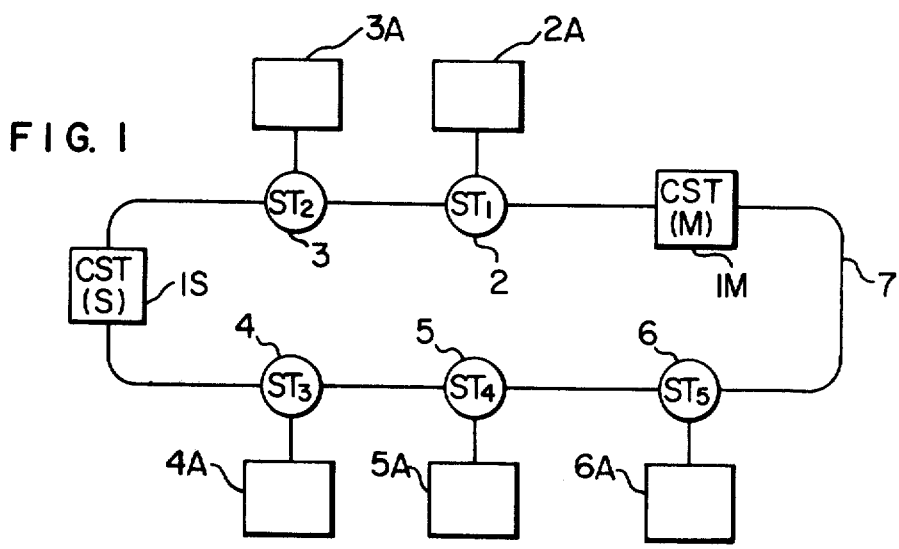
FIG. 1
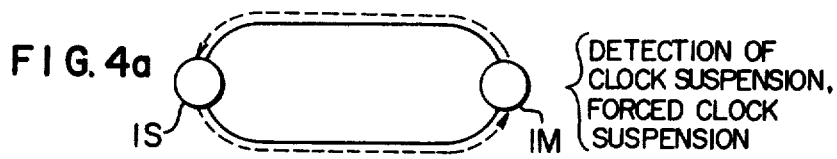
FIG. 4a  DETECTION OF CLOCK SUSPENSION, FORCED CLOCK SUSPENSION
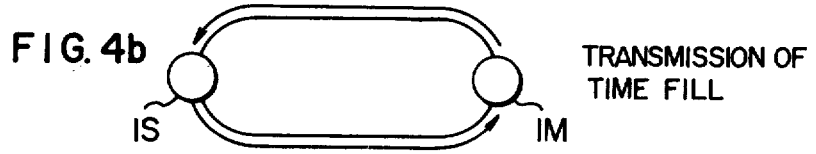
FIG. 4b  TRANSMISSION OF TIME FILL
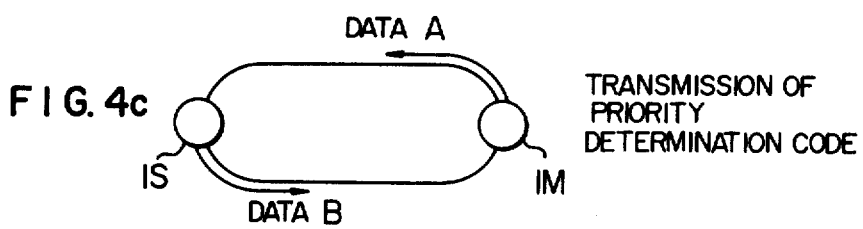
FIG. 4c  TRANSMISSION OF PRIORITY DETERMINATION CODE
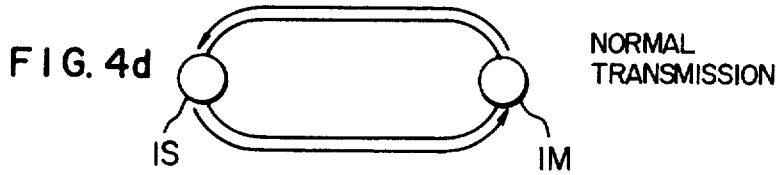
FIG. 4d  NORMAL TRANSMISSION

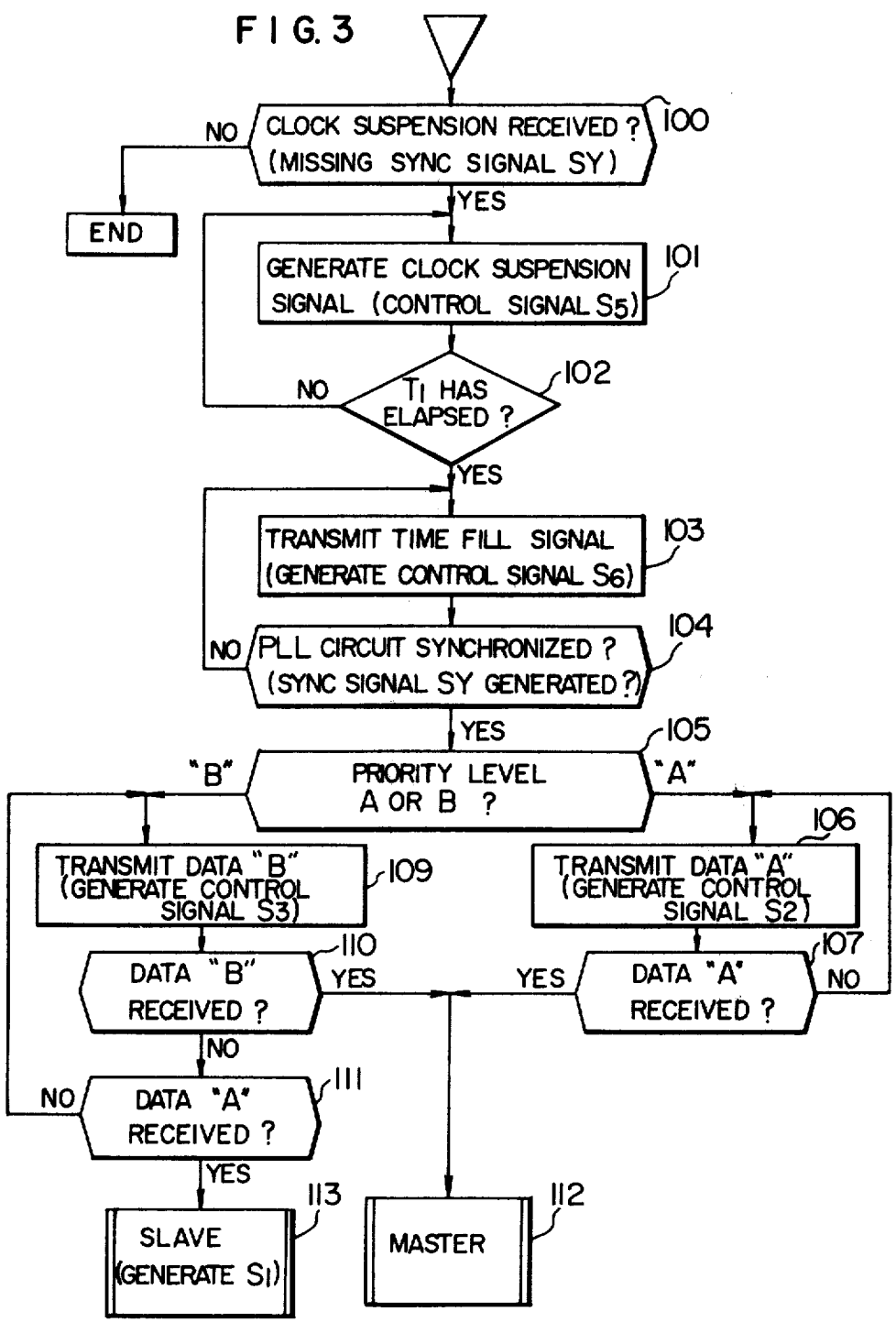

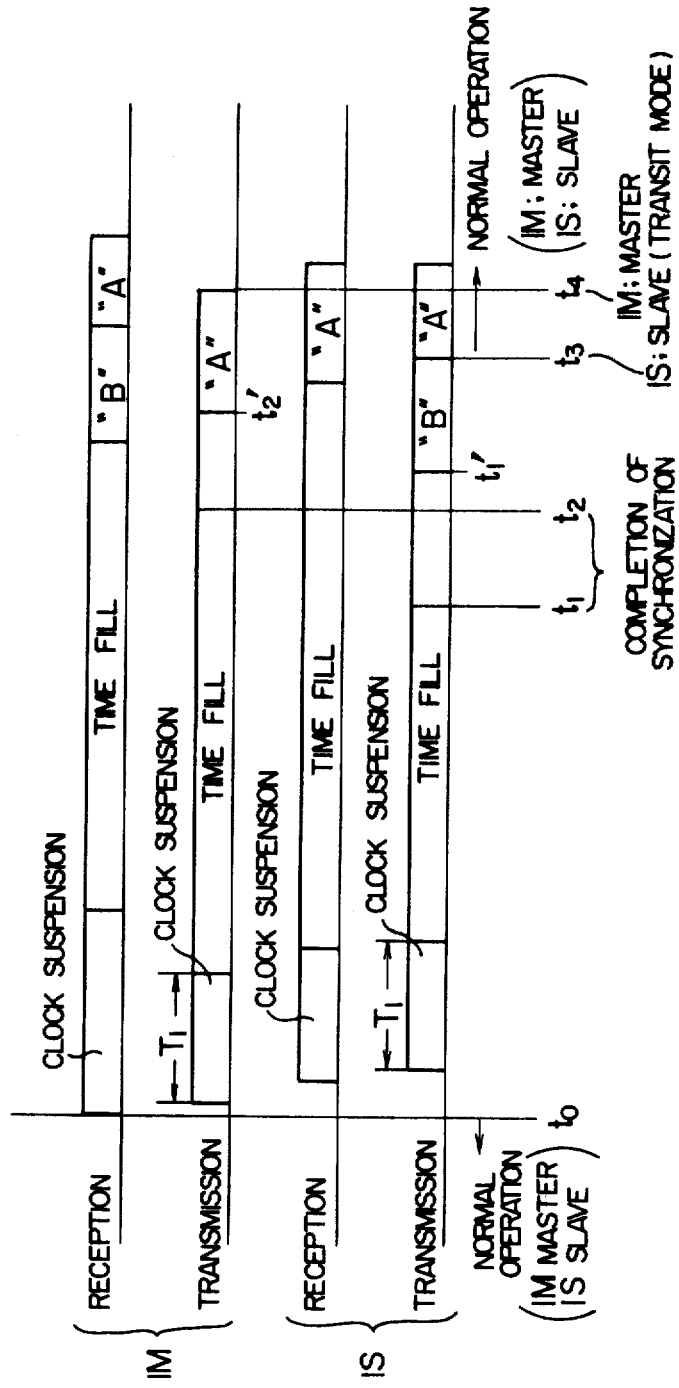

LOOP DATA TRANSMISSION CONTROL METHOD AND SYSTEM

BACKGROUND OF THE INVENTION

The present invention relates to a loop data transmission control method, and particularly to a loop data transmission control system employing multiple control stations which control transmission between a plurality of stations.

The loop data highway system is a transmission system which is widely used in steel and chemical industries for performing production control and computational control for their distributed facilities. In this system, a control station (CST) for transmission control and a plurality of stations (ST) for data transmission and reception are connected through a transmission line to form a loop. Each station (ST) is connected with a computer or a terminal device. In such a system, a breakdown of the CST which controls the overall loop will result in a total system breakdown, and therefore, it is necessary to form a duplex system in some way so that uninterrupted transmission is achieved. An improved duplex CST system which is free from the problems caused by duplicating control stations is disclosed in Japanese Patent Application No. 50-14315 (Patent Laid-Open No. 51-90245).

This known system will be described briefly. In this system, CSTs with independent power supplies are installed separately in arbitrary locations on the transmission loop. One CST is used as an active device (master CST) and another CST is used as inactive device (slave CST). The major reasons for the industrial installation are as follows.

(1) The system is easily controlled and managed upon occurrence of CST mulfunctioning and power loss or local power failure during the maintenance activity for the CST or associated devices, whereby a high security system can be provided.

(2) The CSTs can be installed in arbitrary locations on the loop, thereby allowing a flexible system organization.

The active CST issues suitable transmission command signals for allowing data transmission between the stations (STs). This signal consists of a code section representing a synchronization signal and another code section specifying the address of a station which is allowed to proceed with a transmission. The signal format may differ slightly depending on each transmission system. In any case, however, the transmission command signal is a digital code signal including clock information. On receiving the transmission command signal, the stations (STs) and the control stations (CSTs) extract the clock information from the signal so that it can be used as a clock signal for controlling the processing in each station. For this purpose, each of the STs and CSTs is provided with a phase locked loop circuit (PLL) which operates to oscillate in response to the leading edge or trailing edge of the transmission command signal.

In such a duplex CST system, one station needs to be the master and another station the slave. Two stations cannot act as either the slave or the master at the same time. In the case of both stations being the slaves, the transmission command signal is not issued at all, resulting in a system down condition since transmission is not possible. In the other case of both stations being masters, the unique transmission command signal cannot be obtained and normal transmission does not take place, eventually resulting in a system down condition. Such problems in the duplex CST system are liable to occur when the clock signal on the transmission line is suspended. This can occur when two CSTs take action at substantially the same time to control transmission, resulting in a failure of the master/slave determination. In order to solve the problem caused by such conflict between two CSTs, the above referenced publication proposes to control the CSTs in the following manner.

I. Detection of Clock Suspension

If a CST receives no transmission signal for some reason, a clock signal of normal frequency cannot be produced due to lack of clock information. (Hereafter, this situation will be called the clock suspension state.) The CST checks if this state would last for a first predetermined time period $T_1$, while inhibiting transmission of the transmission command signal.

II. Transmission of Time Fill Signal

On expiration of the first predetermined time period $T_1$ following the clock suspension, the CST transmits a time fill signal, whose bits representing clock and data sections are all "0", for a second predetermined time period $T_2$.

III. Clock Suspension

On expiration of the second predetermined time period $T_2$, the CST suspends its clock transmission for a third predetermined period $T_3$ specified for the particular CST. The system of the aforementioned Japanese patent application is characterized in that two CSTs are given different third predetermined time periods.

IV. Transmission of Time Fill Signal

On expiration of the third predetermined time period, the CST transmits the time fill signal again. After a fourth predetermined time period $T_4$ has elapsed, the CST recognizes itself as the master CST and begins to transmit the normal transmission command signal. On the other hand, if the CST receives the time fill signal from another CST before expiration of the third predetermined time period, the CST recognizes itself as the slave CST. As described in the Japanese patent application, this system can correctly set one CST to be the master and another CST to be the slave in various transient states. However, it takes disadvantageously a long total processing time which may be the sum of the following times:

Stage I:

Time for detecting the clock suspension, Ta: several $\mu s$ are required because the system is arranged such that the PLL circuit is forced to reset when 2-3 clock signals have been missed.

Time for continuing the clock suspension, T1: several tens of $\mu s$ are required, because this time must be long enough to allow the transmission signal to pass once around the loop transmission line connecting the stations.

Stage II:

Time for transmitting the time fill signal, $T_2$: more than ten ms are required so that the PLL circuits of all STs and CST are brought into synchronism with the clock information.

Stage III:

Time for continuing the clock suspension, T₃: several tens of μs are required according to the same consideration as that in T₁.

Stage IV:

Time for transmitting a time fill signal, T₄: more than ten ms are required according to the same consideration as that in T₂.

As can be seen from the above discussion, the time needed to start up the system after occurrence of the clock suspension is mainly dependent on the start-up time of the PLL circuit, which is approximately 30 ms. In this known system, reduction of the PLL start-up time is limited, and the time for synchronization of the PLL circuits at stage II is indispensable in order to prevent both of the CST's from being simultaneously designated as the master under various conditions.

SUMMARY OF THE INVENTION

Accordingly, it is an object of the present invention to provide a data transmission control method which achieves priority arbitration control for selecting one of two CST's as the master in a short time with reliability. According to the present invention, a clock suspension output signal is transmitted in response to the detection of clock suspension state, thereby causing the PLL circuits of all stations to be out of synchronization. Then, the time fill signal is transmitted for putting the PLL circuits of all stations into a synchronizing state. Each control station transmits a priority determination code indicative of a specific priority level allotted to that control station, and determines whether it will be the master control station or a slave control station in accordance with the priority level of the received priority determination code.

BRIEF DESCRIPTION OF THE DRAWINGS

FIG. 1 is a diagram showing schematically the structure of the loop data transmission control system using the present invention.

FIG. 3 is a block diagram for the priority arbitration control by the CST shown in FIG. 2.

FIGS. 4a to 4d are illustrations showing the states of the transmission line during a sequence of procedures shown in FIG. 3.

FIG. 5 is set of timing charts showing the states of the transmission signals of respective portions during priority arbitration control performed by the program of FIG. 3.

DESCRIPTION OF THE PREFERRED EMBODIMENTS

Figure 2:
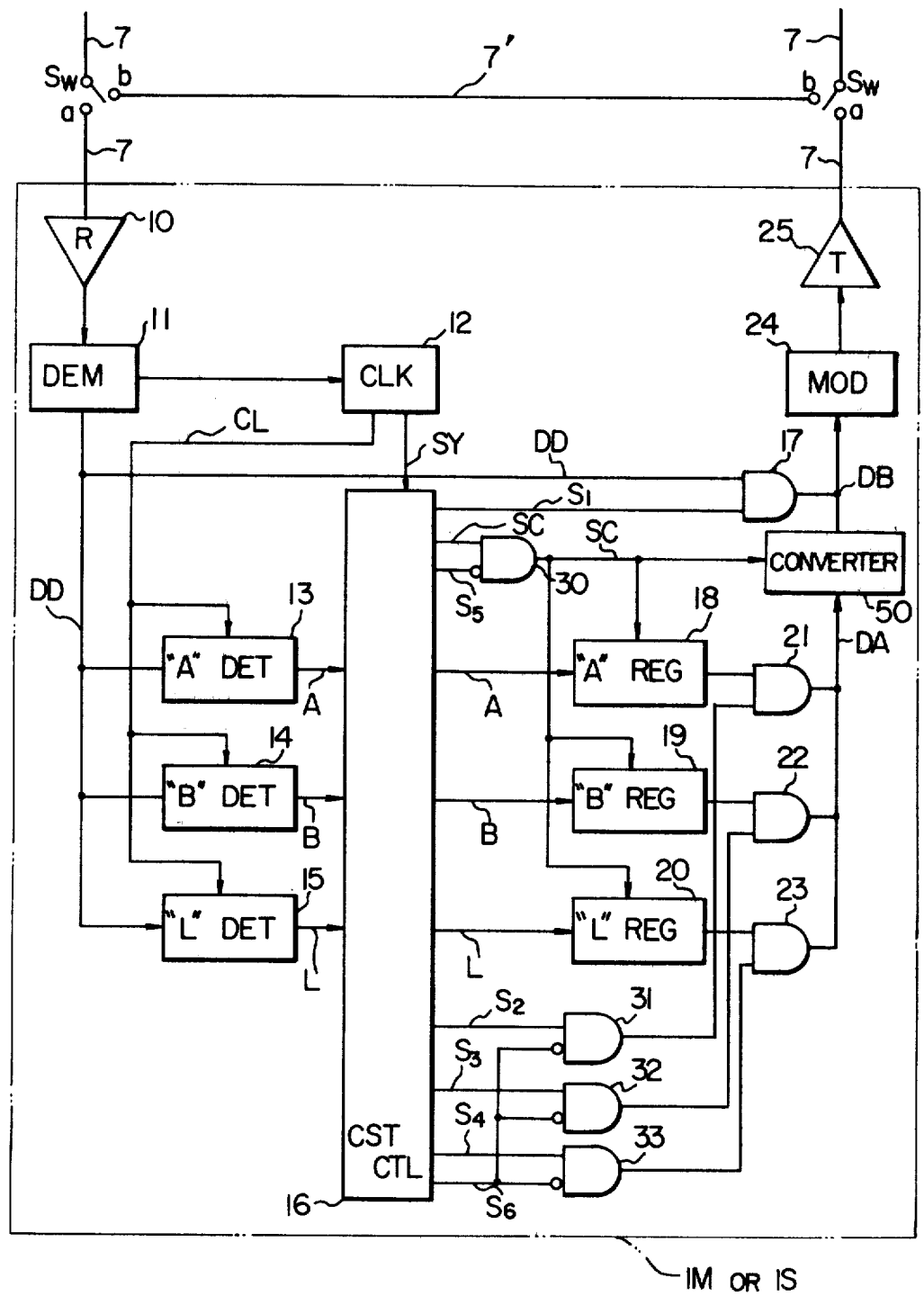
FIG. 2 is a diagram showing the arrangement of the CST according to the present invention.

FIG. 1 shows schematically the structure of the data transmission control system which is applicable to the present invention. In the figure, a pair of control stations 1M and 1S and a plurality of stations 2, 3, 4, 5 and 6 are connected together by way of a loop transmission line 7. Reference numbers 2A, 3A, 4A, 5A and 6A denote computers, terminal devices, or the like connected to the stations 2, 3, 4, 5 and 6, respectively. FIG. 2 shows schematically the arrangement of the control stations 1M and 1S of the present invention applied to the data transmission control system shown in FIG. 1. In the figure, switches SW are used to establish a bypass system for the control station 1M or 1S, and they are turned to side "a" when the control station has been powered on or by manual operation. The bypass system consisting of the switches SW and a bypass line 7' is shared by all STs and CSTs.

The arrangement of the control station will now be described. A signal on the line 7 is delivered through a receiver (R) 10 to a demodulator (DEM) 11, and a clock signal CL is extracted by a clock extractor (CLK) 12 including a PLL circuit. The clock signal CL is sent to priority determination data-A and data-B detectors (DETs) 13 and 14, and also a loop control data detector 15. At the same time, the clock extractor 12 generates a synchronization completion signal SY and sends it to a CST controller (CST/CTL) 16. Demodulated data DD delivered from the demodulator 11 is applied to the data-A detector 13, data-B detector 14 and the loop control data detector 15. The data-A and data-B detectors store codes corresponding to priority determination data-A and priority determination data-B, respectively, and compare the received demodulated data DD with the respective codes stored therein at the timing of the clock signal CL. If the demodulated data DD coincide with the code stored in the data-A detector 13 or the data-B detector 14, a data-A a data-B signal is produced by the data-A detector 13 or the data-B detector 14, respectively. The loop control data detector 15 stores both codes corresponding to the priority determination data-A and data-B, respectively, and delivers the receives demodulated data DD, as loop control data L, when the data DD does not coincide with any of the stored codes.

There are provided two data transmission modes in each control station. That is, when a particular CST is the slave, the CST controller 16-issues a control signal S1 continuously so that demodulated data DD is transmitted over the transmission line 7 through a gate 17, a modulator 24 and a transmitter 25. This state is called the transmit mode. When a particular CST is the master, the CST controller 16 takes part in transmission data control. This is performed in such a way that, according to the type of data, the priority determination data A is stored in a data-A register 18, priority determination data B is stored in a data-B register 19, and the loop control data L is stored in a loop control data register 20, and their contents are outputted through respective gates 21, 22 and 23 which are enabled by control signals S2, S3 and S4 as selected by the CST controller 16. The registers 18, 19 and 20 and a signal converter 50 are supplied with a sending clock SC from the CST controller 16. The output DA of any gate 21, 22 or 23 is converted through a signal converter 50 into a signal of the form adapted to be transmitted through the transmission line as mentioned hereinafter. The output DB of the converter 50 or the transit mode selection gate 17, whichever is effective, is modulated by the modulator (MOD) 24 and transmitted through the transmitter 25 over the line 7. Also provided are blocking gates 30, 31, 32 and 33 which are arranged to block the sending clock SC from passing to the staions located downstream of the particular CST when a control signal S5 is produced from its CST controller 16 and to cause the particular CST to transmit the time fill signal when a control signal S6 is produced.

The signal converter 50 is provided to convert the signal applied thereto, which may be in a form, of, for example, a NRZ code, which is adapted to be processed in the CST controller 16, into the form of, for example, a RZ code, which is adapted to be transmitted through the transmission line. For example, the sending clock SC, which is applied to one of the inputs of the converter 50, is a pulse signal which is at high level for a time period $\tau_1$ and goes to low level which continues for the same period $\tau_1$. When the signal DA, for example, which is applied to the other input of the converter 50, is "1", the converter 50 transmits a signal corresponding to ½ frequency-division of the sending clock SC for a time period $4\tau_1$, while when the signal DA is "0" the converter 50 transmits a signal corresponding to the sensing clock SC for a time period $4\tau_1$. Thus, the output DB of the converter 50 is in the form of a RZ code which rises or falls every time period $2\tau_1$, depending on whether the output DB represents "1" or "0". The demodulated data DD derived from the demodulator 11 is also in the form of a RZ code and hence is converted into the form of a NRZ code when processed in the CST control.

When the control signal S5 appears, the converter 50 receives no sending clock SC so that the output DB does not change its level. The stations located downstream detect the absence of a normal transmission signal which should change its level every time period $2\tau_1$ and determine that a clock suspension state has occurred. Thus, the control signal S5 is effective to forcibly block the sending clock SC applied to the registers 18, 19 and 20 and the converter 50. When the control signal S6 is produced, the gates 31, 32 and 33 produce an output at level "0" and hence the AND gates 21, 22 and 23 also produce an output of level "0" so that the signal DA is "0" which is transmitted after being converted into the RZ code whose level changes every time period $\tau_1$. Therefore, the downstream stations are able to extract the clock information based on the level change of the received transmission signal and to determine that this signal is the time fill signal because the bits of the signal are all "0".

Among various operations of the CST controller 16 in the arrangement of the CST as described above, the priority arbitration control program related directly to the present invention is shown in FIG. 3. FIG. 3 shows a sequence of procedures for priority arbitration control, in which, when the clock suspension state is detected at step 100 (this is detected by checking the absence of the synchronization signal SY at the output of the clock detector 12), the control signal S5 is issued at step 101 so as to suspend the clock signal in the transmission signal which is sent from the CST over the transmission line 7. However, if the CST is the slave in the transit mode, the control signal S1 is negated to release the control station from the transit mode, with the result that the clock is automatically suspended. After expiration of a period $T_1$ in this state has been checked at step 102, the control signal S6 is issued at step 103 so that the time fill signal is transmitted over the line 7. The time fill signal is supplied to the clock detector within the stations and another control station connected on the downstream transmission line. The PLL circuit in each clock detector operates in synchronism with the clock of the time fill signal. Because of the looped transmission line, the PLL circuit of the particular CST also operates to synchronize with the incoming time fill signal. The PLL circuit of the particular CST does not always synchronize with its own clock. This can easily be understood in FIG. 1, where the stations 2 and 3 and the control station 1S synchronize with the clock of the time fill signal transmitted from 1M which is assumed to be the particular CST. In this control state, the CST 1S, is in the same control state as will be described later. Thus, the CST 1S also transmits the time fill signal, and the stations 4, 5 and 6 and the CST 1S synchronize with that clock. When the switches SW (see FIG. 2) are turned to the "b" side to put the CST 1S into the bypass mode, the PLL circuits of all stations and the CST synchronize with the clock of the CST 1M. Strictly speaking, therefore, the clock of control station 1M and the clock of 1S are out of control station synchronization. However, since these clocks have been adjusted to have the same frequency, they would have a phase difference of a half cycle in the worst case. At the time when all stations and control stations are synchronized, the synchronization completion signal SY is obtained at the clock detector 12 of the particular CST. When the SY signal is obtained at step 104, control proceeds to step 105 and the priority of the particular CST is checked. Each CST is provided with a high priority level "A" or a low priority level "B", and the two CSTs have different priority levels.

Steps 106 and 107 are the processing procedures for the CST with the high priority level "A", and steps 109, 110 and 111 are the processing procedures for the CST with the low priority level "B". In these procedures, the particular CST transmits its priority determination code A or B, and determines whether it would be the master or the slave depending on whether the received determination code is A or B. If the CST has the priority level "A", it generates the control signal S2 at step 106 and transmits the priority determination code A through the A register 18 and the gate 21. At step 107, the CST checks the level of the priority determination code which it has received. If the CST has received "A", it recognizes itself as the master at step 112 and starts normal transmission control. If the CST has not received data A, it transmits data A again at step 106. The CST having the priority level "B" generates a control signal S3 at step 109 and transmits the priority determination code B through the B register 19 and the gate 22. At steps 110 and 111, the CST checks the level of the priority determination code which it has received. If the CST has received code "B", it recognizes itself as the master and starts the normal transmission control. If the CST receives data A, it recognizes itself as the slave at step 113. In this case, the CST generates a control signal S1 at step 113 to enable the gate 17 to specify the transit mode, in which demodulated data DD is not delivered to the control station controller 16, but is directly sent to the following station. Determination of the master and slave relationship at steps 106 through 113 will be described with reference to FIG. 4.

FIGS. 4a to 4d show a sequence of procedures by the program shown in FIG. 3. In FIG. 4a, the clock suspension is detected and the downstream side of the CST is forced into clock suspension. In FIG. 4b, the time fill signal is transmitted for synchronizing the PLL circuit of all stations. In FIG. 4c, the priority determination code is transmitted, and in FIG. 4d, the master/slave relation is determined.

The establishment of the correct master and slave relationship in accordance with the present invention will now be described. It must be clarified first when and by what cause the clock suspension, which triggers the execution of the program of FIG. 3, occurs. There are two major causes of clock suspension. One is the permanent breakdown of the transmission line such as a broken wire, however, this disables transmission itself and activation of CSTs according to this invention is impossible. The present invention achieves a correct master and slave determination upon occurrence of a clock suspension caused by a momentary failure in switching, for example, by the bypass switch SW (see FIG. 2). A typical problem due to the above-mentioned second cause is that two CSTs detect the clock suspension substantially at the same time and activate the program of FIG. 3 substantially at the same time. This conflict over transmission priority is shown in FIG. 5, in which the system operates normally before the time point $t_o$ and control stations 1M and 1S are assumed to be the master and the slave, respectively. It is also assumed that the clock suspension has occurred due to failure in switching of the switch SW in one of the stations, and it is first detected by 1M at point $t_0$. Then, control station 1M stops its sending clock and thereafter control station 1S detects the condition of no clock information. As a result, control station 1S suspends its transit mode and stops its own clock. The control stations 1M and 1S start to transmit the time fill signal at step 103 after expiration of the period $T_1$ following each clock suspension, and they complete synchronization of their PLL circuits at point $t_2$ and point $t_1$, respectively, then terminate the transmission of the time fill signal at step 104. Preferably, the time fill signal is transmitted for a while after the PLL circuit has been synchronized, so that synchronization of only one CST can be prevented. FIG. 5 shows the signal waveforms during such operation. The figure shows that the time fill signals of control stations 1S and 1M last until $t_1'$ and $t_2'$, respectively. The control station 1M starts to transmit the priority determination code A at $t_2'$ in step 109, and control station 1S starts to transmit the code B at $t_1'$ in step 109. The code B is received by control station 1M, and code A is received by control station 1S. However, steps 106 and 107 never cause the control station 1M to detect the code B. On the other hand, by detecting the code A, 1S control station recognizes itself as the slave in step 111 and sets itself to the transit mode. Assuming that 1S is switched to the transit mode at $t_3$, 1S transmits a received input signal, i.e. code A, after $t_3$. Then, control station 1M can receive the code A, and it is switched to the master CST later at $t_4$. After switching to the master CST, the transmission output of control station 1M is replaced with the loop transmission control output. According to the present invention as described above, the waveforms of respective portions during priority arbitration control for two CSTs are as shown in FIG. 5. The only difference is as to which one of control stations 1M and 1S detects the clock suspension first, and when one detects the clock suspension, the other is forced to detect it. Ultimately, the lower priority station is determined to be the slave first, then the higher priority station is determined to be the master.

Next, the following describes the determination of the master CST without referring to the priority determination code. This is not the case of priority arbitration control, but the case in which the clock suspension occurs when one CST takes transmission control while another CST is removed from the transmission line. The operation is exactly the same as described previously up to the step 104 in FIG. 3. If the particular CST is on the "A" side, the transmitted code A circulates on the loop and is received by the particular CST, which is then determined to be the master correctly through the steps 106, 107 and 112. If the particular CST is on the "B" side, it is determined to be the master correctly by receiving the code B through the steps 109, 110 and 112. In considering the operation for connecting another CST to the transmission line in this state, the bypass switch SW (in FIG. 2) needs to be switched from side "b" to side "a". As a result, the operating CST detects the clock suspension and suspends the transmission of its clock. The following operation is exactly the same as described with reference to FIG. 5, and the higher priority CST will take transmission control.

Finally, in considering the switching of a CST due to a malfunction during transmission control, the controlling CST detects its own abnormality by some means not shown in FIG. 2, and disconnects itself from the transmission line. As a result, another CST detects the clock suspension and recognizes itself as the master CST as in the case of the clock suspension during the single CST operation as described above.

As described above in detail, the present invention achieves the correct master and slave determination for various cases of clock suspension. Moreover, time needed for prority arbitration control can be almost halved relative to the conventional system. This can easily be understood from the fact that two synchronizing operations which has been the major cause of the time delay in the conventional system is reduced to a single operation.

We claim:

1. A loop data transmission system comprising a loop transmission line and a plurality of stations including at least two control stations connected to said loop transmission line for effecting data transmission between stations via said transmission line;

wherein each of said control stations includes control means for controlling that control station so that one of said control stations operates as master to normally control data transmission through said transmission line while the other of said control stations operates as slave to be normally ready for operating as master in place of said one control station, first means responsive to said control means for operating said control station as a slave in a transit mode wherein data transmissions received from said transmission line are applied directly back to said transmission line, and second means responsive to said control means for operating said control station as a master in a control mode to control data transmission on said transmission line including the application to said transmission line of a clock signal for controlling the operations of said stations, each of said plurality of stations and said two control stations including clock extractor means for extracting a clock signal from a signal received from said transmission line; and wherein said control means in each of said control stations includes third means connected to said first and second means for suspending transmission of a clock signal for a first predetermined time period upon detection of a state of clock suspension in which no clock signal is received from said transmission line, fourth means for controlling said second means to transmit a clock signal for a second predetermined time period after said suspension of the clock transmission, fifth means for controlling said second means to transmit a priority determination signal indicative of the level of priority of that control station for being master as compared to the other control station after transmission of the clock signal during said second predetermined time period, sixth means for comparing a priority determination signal received on said transmission line with the priority determination signal transmitted under control of said fifth means, seventh means responsive to said comparing means indicating that said received priority determination signal is of higher priority level than said transmitted priority determination signal for actuating said first means to operate said control station as a slave in a transmit mode, and eighth means responsive to said comparing means for determining that the control station has the priority to be master to control data transmission through said transmission line by detecting when said received priority determination signal is identical to said transmitted priority determination signal and for actuating said second means to place said control station in the control mode.

2. A loop data transmission system according to claim 1, wherein each control station includes an input circuit having a receiver and a demodulator connected in series to said transmission line and an output circuit having a modulator and a transmitter connected in series to said transmission line, and wherein said first means in said control means includes means for connecting the output of said demodulator to the input of said modulator in resonse to said seventh means.

3. A loop data transmission system according to claim 2, wherein said seventh means is inhibited by said third means upon detection of said state of clock suspension.

4. A loop data transmission system according to claim 1, wherein said clock extractor means in each station and control station includes a phase locked loop.

5. A loop data transmission system according to claim 1, wherein said second means in said control means includes means for selectively applying loop control data to said transmission line at the timing of said clock signal in response to said eighth means.

6. A method for controlling a loop data transmission system in which a loop transmission line is connected to a plurality of stations including at least two control stations for effecting data transmission between stations via said transmission line under control of one of said control stations operating as a master while the other station remains in a standby condition as a slave; said method comprising transmitting a clock signal via said transmission line through said stations and said station operaing as a slave from said station operating as a master;

suspending transmission of said clock signal to said transmission line in both of said control stations for a first predetermined time period upon detection of a state of clock suspension in which no clock signal is received in the control station from said transmission line;

transmitting from said control stations a clock signal for a second predetermined period of time after said first predetermined period of time;

transmitting from said control stations on said transmission line respective priority determination signals indicative of the level of priority of that control station for operating as a master as compared to the other control station after said second predetermined time period;

comparing in each control station the priority determination signal transmitted therefrom with a priority determination signal received from said transmission line;

controlling a control station to operate as a master and transmit loop control data on said transmission line when the transmitted and received priority determination signals are found to be identical; and controlling a control station to operate as a slave and directly apply to the transmission line data signals received from the transmission line when the transmitted and received priority determination signals are not identical.

* * * * *